United States Patent [19]

Kitrell

[11] Patent Number: 4,852,970

[45] Date of Patent: * Aug. 1, 1989

[54] VISUAL SIGNAL DEVICE FOR A BICYCLE

[76] Inventor: John V. Kitrell, 4639 Holdrege St., Lincoln, Nebr. 68503

[ * ] Notice: The portion of the term of this patent subsequent to Aug. 1, 2006 has been disclaimed.

[21] Appl. No.: 146,302

[22] Filed: Jan. 21, 1988

[51] Int. Cl.⁴ .......................... G02B 5/12; B60Q 1/26; A47F 5/00; B80R 1/02

[52] U.S. Cl. .......................... 350/99; 116/41; 248/289.1; 248/478; 280/288.4; D10/111

[58] Field of Search ...................... 350/97, 99; 116/41, 116/53; D10/109, 111; 248/478, 477, 289.1, 282; 280/289 R

[56] References Cited

U.S. PATENT DOCUMENTS

| | | | |
|---|---|---|---|
| D. 244,918 | 7/1977 | Kitrell | D10/111 |
| D. 246,444 | 11/1977 | Kitrell | D10/111 |
| 2,939,364 | 6/1980 | Doswell et al. | 248/478 |
| 4,003,630 | 1/1977 | Kirk | 350/97 |
| 4,046,397 | 9/1977 | Kitrell | 116/41 |
| 4,113,351 | 9/1978 | Kitrell | 350/99 |
| 4,116,154 | 9/1978 | Harris | 350/97 |

FOREIGN PATENT DOCUMENTS

| | | | |
|---|---|---|---|
| 1009201 | 4/1977 | Canada | 362/72 |
| 0014986 | 9/1980 | European Pat. Off. | 350/97 |
| 2622275 | 12/1977 | Fed. Rep. of Germany | 350/99 |
| 1237231 | 6/1960 | France | 248/289.3 |
| 936465 | 9/1963 | United Kingdom | 350/99 |

Primary Examiner—Bruce Y. Arnold
Assistant Examiner—Ronald M. Kachmarik
Attorney, Agent, or Firm—Zarley, McKee, Thomte, Voorhees & Sease

[57] ABSTRACT

A visual signal device for a bicycle comprising a base portion secured to the front fork or the rear fork of the bicycle having an upstanding channel-shaped support member selectively rotatably mounted thereon. A light reflective surface is provided on one side of the support member and a highly visible day glow orange material is provided on the other side thereof. A plurality of flat members are pivotally connected at their lower ends to the support member and may be pivotally moved from a stored position to an operative position.

3 Claims, 2 Drawing Sheets

VISUAL SIGNAL DEVICE FOR A BICYCLE

BACKGROUND OF THE INVENTION

This invention relates to a visual signal device for a bicycle and more particularly to a two-sided device which has a light reflective means on one side and which has a "day glow orange" material on the other side thereof. The signal device is selectively rotatable to permit either the light reflective means or the day glow orange material to be presented in the desired direction.

Heretofore, various types and sizes of reflective materials have been assembled into devices to provide protection during darkness for objects to which they are attached when these objects are subjected to a light source from approaching vehicles. When such prior devices have been used previously, the mass described by the reflected light, when viewed from a distance, has been on a one-to-one ratio with the area of the reflective material presented by the devices. Thus, the prior devices presented a continuous source of compromise between desired adequate illumination and practicality of such a device from the standpoint of cost, size, appearance in daylight, and general consumer acceptability.

The above-described difficulties were solved, for the most part, by applicant's earlier U.S. Pat. Nos. 4,046,397 and 4,113,351. In particular, the instant invention is deemed to be an improvement of the device disclosed in U.S. Pat. No. 4,046,397. In the device of the '397 patent, a plurality of flat rectangular shaped reflector members were pivotally mounted within an elongated, upstanding channel-shaped support with the reflector member being selectively pivotally moveable with respect to the support to present a generally fan-shaped outline.

Although the device of the '397 patent has met with some success, it has been found desirable to be able to rotate the upstanding support so that a light reflective surface may be presented in the desired direction at night and so that a highly visible day glow orange surface will be presented in the desired direction during daylight hours.

It is therefore a principal object of the invention to provide an improved safety reflector device.

A further object of the invention is to provide a visual signal device for a bicycle or the like which provides a large reflective mass when viewed by night.

Still another object of this invention is to provide a visual signal device for a bicycle which provides a large display when viewed during daylight but which may be convertible to a small esthetically acceptable device if desired.

Still another object is to provide a device of the type described which may be selectively rotatably moved to present either a light reflective surface or a highly visible day glow orange surface.

These and other objects will be apparent to those skilled in the art.

SUMMARY OF THE INVENTION

Figure 1:
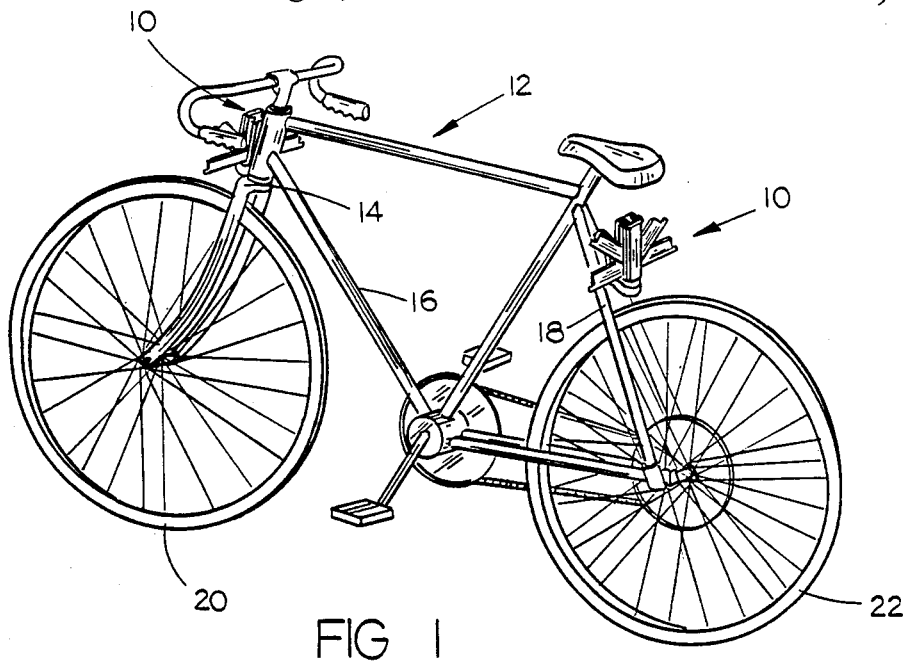
FIG. 1 is a perspective view of the bicycle having the devices of this invention mounted on the rearward and forward ends thereof.
Figure 2:
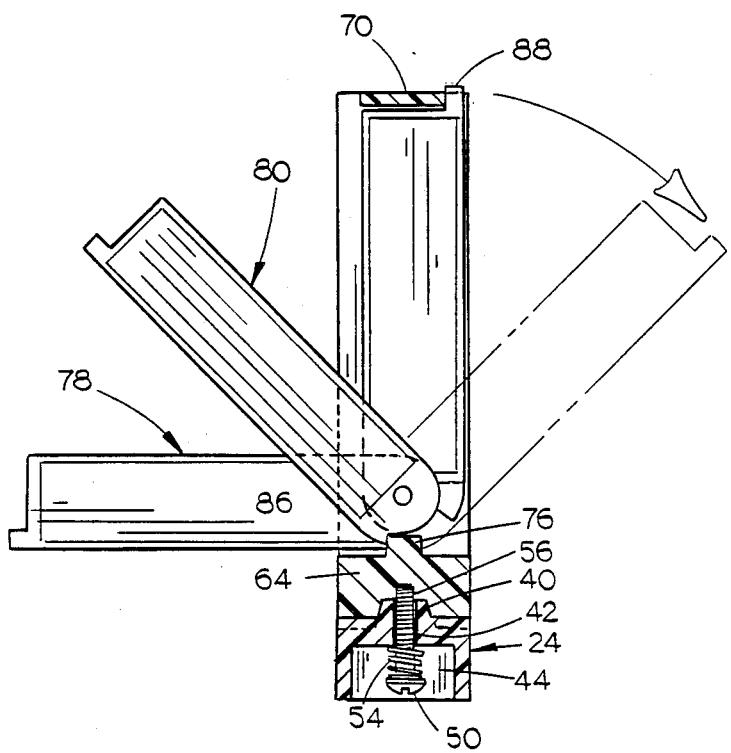
FIG. 2 is a longitudinal sectional view of the device with the broken lines indicating the movement of the reflector members.
Figure 3:
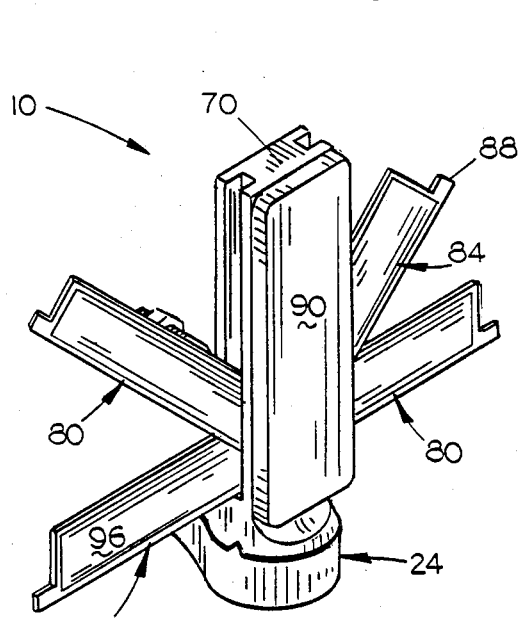
FIG. 3 is a rear perspective view of the device with the reflector members in the fan-shaped position.
Figure 4:
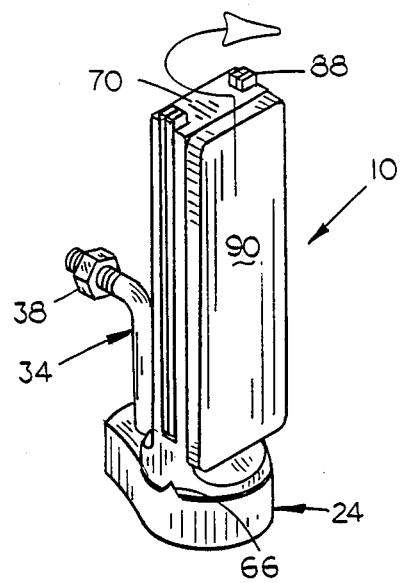
FIG. 4 is a rear perspective view illustrating the device in its closed position.
Figure 5:
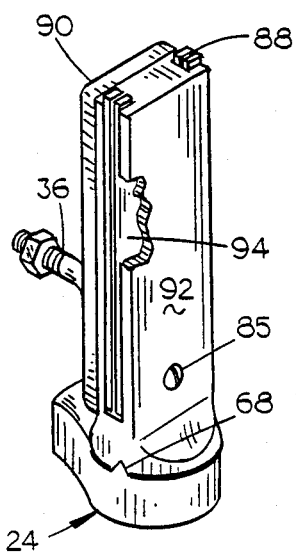
FIG. 5 is a view similar to FIG. 4 except that the standing support has been rotated 180° with respect to FIG. 4.
Figure 6:
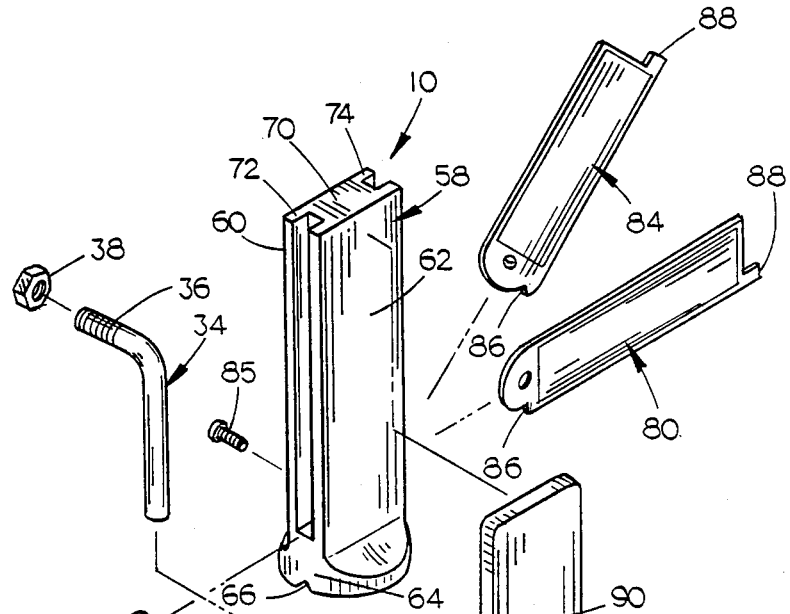
FIG. 6 is a exploded perspective view of the device.
Figure 6:
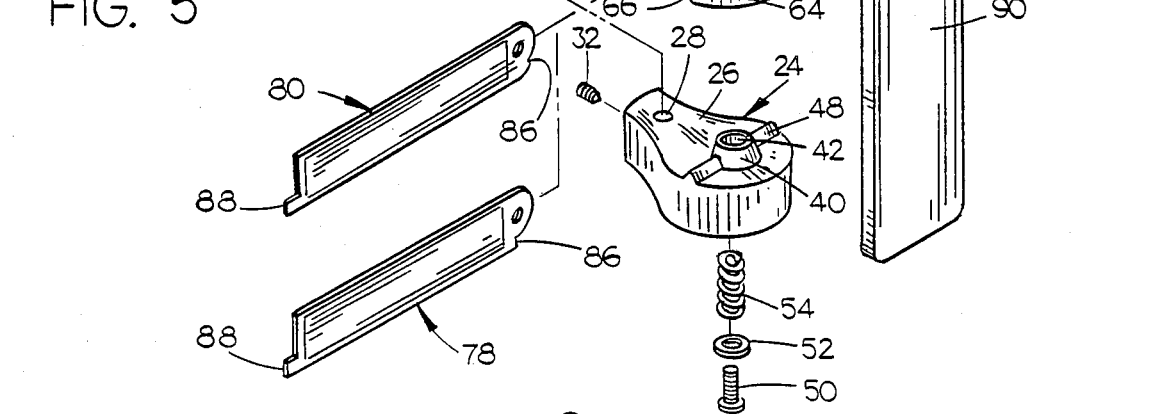

The visual signal device of the invention may be mounted on either the front or back portions of a bicycle or the like and comprises a base portion which is adapted to be secured to the front fork or the rear fork of the bicycle. An upstanding channel-shaped support member is selectively rotatably mounted on the base portion and has a light reflective surface provided on one side thereof and a highly visible day glow orange material on its other side. A plurality of flat members or segments are pivotally connected at their lower ends to the channel-shaped support member and may be pivotally moved from a stored position to an operative position. One side of each of the flat members has a light reflective surface thereon while the other side of each of the flat members is provided with a day glow orange material thereon. In the stored position, the flat members are received between the side walls of the channel-shaped support member. The flat members may be pivotally moved with respect to the channel-shaped support member and are automatically positioned in a fan-shaped configuration when the flat members are pivotally moved to their operative position. The channel-shaped support member may be selectively rotated with respect to the base portion to present either the day glow orange material or the light reflective material in the desired direction. For example, in daylight hours, the support member at the front of the bicycle will be rotated so that the day glow orange material on the support member and the flat members will be facing forwardly. In daylight hours, the support member at the rear of the bicycle will be rotated so that the day glow orange material on the support member and flat members will be facing rearwardly. At night, the support members at the front and rear of the bicycle will be rotated so that the light reflective surfaces face forwardly and rearwardly, respectively.

DESCRIPTION OF THE PREFERRED EMBODIMENT

The numeral 10 refers generally to the visual signal device of this invention. The numeral 12 refers to a bicycle including a front fork 14, frame 16 and rear fork 18. Front wheel 20 is conventionally mounted in front fork 14 while rear wheel 22 is conventionally mounted in rear fork 18.

Device 10 generally comprises a horizontally disposed base portion 24 having an upper surface 26. As seen in the drawings, base portion 24 is provided with an opening 28 which extends downwardly thereinto adjacent one end thereof. Base portion 24 is also provided with an internally threaded bore at one end thereof extending into one end thereof which communicates with opening 28 and which is adapted to receive set screw 32. Opening 28 is adapted to receive one end of mounting bolt 34 having a horizontally extending portion 36 at the upper end thereof which is externally threaded as seen in the drawings and which is adapted to receive nut 38. Set screw 32 engages the lower end of bolt 34 to maintain base portion 24 on bolt 34. Bolt 34 may be attached to either the front or rear forks as desired.

Base portion 24 is provided with an upwardly extending cylindrical boss 40 having opening 42 extending downwardly therethrough which communicates with recess 44. A pair of oppositely extending V-shaped stops 46 and 48 extend laterally from boss 40 as seen in the drawings.

Bolt 50 is positioned in recess 44 and extends upwardly through opening 42 as seen in the drawings. Washer 52 and spring 54 are mounted on bolt 50 below opening 42. The upper end of bolt 50 is threadably received in threaded opening 56 which is formed in the bottom portion of an upstanding channel-shaped support member 58. For purposes of description, support member 58 will be described as having oppositely disposed walls 60 and 62 which extend upwardly from base 64. Base 64 is provided with a pair of V-shaped grooves 66 and 68 formed in the bottom surface thereof which are adapted to receive the stops 46 and 48 as will be described hereinafter. Top wall 70 extends between the upper ends of walls 60 and 62 and is provided with notches 72 and 74 formed therein. Support member 58 is provided with a centrally disposed stop 76 which extends upwardly from base 64 between walls 60 and 62.

The numerals 78, 80, 82 and 84 refer to flat rectangular-shaped members or segments which are pivotally connected at their lower ends to support member 58 by screw 85. The lower ends of members 78, 80, 82 and 84 are provided with stops 86 formed thereon which are adapted to engage stop 76 so that the outward pivotal movement thereof is limited thereby. The stops 86 on members 78 and 80 are different or offset from one another so that the members 78 and 80 will be automatically positioned in the fan-shaped configuration seen in the drawings. Similarly, the stops 86 on members 82 and 84 are offset from each other, but are identical to stops 86 on members 78 and 80 respectively, so that the stops 86 on members 82 and 84 will engage stop 76 to also position the members 82 and 84 in the fan-shaped configuration. Each of the members 78, 80, 82 and 84 are provided with an upwardly extending shoulder 88 which is provided to assist in moving the members 78, 80, 82 and 84 to the fan-shaped position. The inner ends of shoulders 88 are also designed to engage the inner ends of the notches 72 and 74 as seen in the drawings to limit the inward movement of the members relative to the support member 58.

Wall 62 is provided with a typical light reflective surface thereon such as a prism lens 90 while wall 62 is provided with a typical day visibility material such as a day glow orange material. For purposes of description, the day glow orange material will be referred to by the reference numeral 92. Each of the members 78, 80, 82 and 84 are provided with the same day glow orange material at one side thereof which is referred to generally by the reference numeral 94. The other sides of the member 78, 80, 82 and 84 are provided with a conventional light reflective surface or material thereon referred to generally by the reference numeral 96.

Thus, the device as described may be easily mounted to either the front fork or the back fork of the bicycle. If only a single light reflective surface is desired to be displayed by the devices at the front and rear of the bicycle, support member 58 would be positioned on base portion 24 so that the reflective lens 90 faces in the desired direction. If it is desired to create additional light reflective surfaces, the members 78, 80, 82 and 84 are pivotally moved outwardly into the fan-shaped position as seen in the drawings. If the device is being used in daylight hours, support member 58 would be rotated relative to base portion 24 so that the surface 92 is presented in the desired direction. The members 78, 80, 82 and 84 may be pivotally moved outwardly to the fan-shaped configuration as desired to present a larger visual signal area. Support member 58 is held in either of the positions due to the spring action of spring 54 which yieldably urges support member 58 downwardly relative to base portion 24 with the members 46 and 48 receiving the notches 66 and 68, respectively, or the notches 68 and 66, respectively.

As in applicant's earlier U.S. Pat. No. 4,046,397, when the device is positioned so that the light reflective surfaces are facing in the desired direction, and the device is in the fan-shaped configuration, the device will present a large reflective mass when viewed from a distance but will become a highly distinguishable object as the light source approaches the device. While it has been described that four of the reflective members 78, 80, 82 and 84 may be utilized, it should be noted that any particular number may be used.

Thus, it can be seen that the invention accomplishes at least all of its stated objectives.

I claim:

1. A visual signal device for a bicycle, comprising, a support means, means for securing the support means to the bicycle, an upstanding support member selectively rotatably mounted, between first and second positions, on said support means and extending upwardly therefrom, said support member having spaced-apart opposite front and back sides and opposing right and left sides, one of said front and back sides of said support member having a light reflective surface provided thereon, the other of said front and back sides of said support member having a material provided thereon which is highly visible during daylight hours, and at least a first and second flat, substantially rectangular member having upper and lower ends and opposite sides, each of said members being selectively pivotally secured at the lower end thereof to said supporting support member, said rectangular members having a light reflective surface on one side thereof, said rectangular members having material on the other side thereof which is highly visible during daylight hours, said first rectangular member being selectively pivotally movable from a super-imposed stored position in said support member to an operative position, pivoted to the left, outwardly from said support member, said second rectangular member being selectively pivotally movable from a super-imposed stored position in said support member to an operative position, pivoted to the right, outwardly from said support member, said rectangular members having substantially their entire lengths spaced from each other and said support member, when in said operative position so as to form a fan-shape, and means selectively rotatably mounting said support member to said support means whereby either the light reflective surfaces or the highly visible material may be presented in the desired viewing direction.

2. The device of claim 1 further comprising:

third and fourth flat, substantially rectangular members having upper and lower ends and opposite sides, each of said members being selectively pivotally secured at the lower end yhereof to said upstanding support member, said third and fourth rectangular members having a light reflective surface on one side thereof, said third and fourth rectangular members having material on the other side thereof which is highly visible during daylight hours, said third rectangular member being selectively pivotally movable from a super-imposed stored position in said support member to an operative position, pivoted to the left, outwardly from said support member, said fourth rectangular member being selectively pivotally movable from a super-imposed stored position in said support member to an operative position, pivoted to the right, outwardly from said support member, said third rectangular member having substantially its entire length spaced from said first rectangular member and said support member, and generally intermediate therebetween, when in said operative position, said fourth rectangular member having substantially its entire length spaced from said second rectangular member and said support member, and generally intermediate therebetween, when in said operative position, said operative positions of said first and second rectangular members being substantially horizontal, perpendicular to said support member whereby said rectangular members form a fan-shape when moved to their operative positions.

3. The device of claim 2 further comprising stop means on said rectangular members to prevent pivotal movement thereof beyond their operative positions, and wherein said rectangular members are mounted on said support member so as to maintain their operative positions by force of gravity.

* * * * *